(12) United States Patent
Tsuchida

(10) Patent No.: US 7,020,134 B2
(45) Date of Patent: Mar. 28, 2006

(54) MULTIPLEXING METHOD, A MULTIPLEXING APPARATUS AND A NETWORK THEREWITH

(75) Inventor: Shinichi Tsuchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 939 days.

(21) Appl. No.: 10/092,964

(22) Filed: Mar. 5, 2002

(65) Prior Publication Data

US 2002/0093958 A1    Jul. 18, 2002

Related U.S. Application Data

(63) Continuation of application No. PCT/JP99/05682, filed on Oct. 14, 1999.

(51) Int. Cl.
*H04J 1/00*    (2006.01)
(52) U.S. Cl. ...................... 370/383; 370/375
(58) Field of Classification Search ........... 370/375, 370/378, 379, 381, 382, 383, 386, 389, 395.7, 370/428, 429, 442, 463, 458
See application file for complete search history.

(56) References Cited

U.S. PATENT DOCUMENTS 5,434,857 A  *  7/1995  Mori ..................... 370/382

FOREIGN PATENT DOCUMENTS

| JP | 60079896 | 5/1985 |
| JP | 02002299 | 1/1990 |
| JP | 02020135 | 1/1990 |
| JP | 04156197 | 5/1992 |
| JP | 05199554 | 8/1993 |

* cited by examiner

*Primary Examiner*—Brenda Pham
(74) *Attorney, Agent, or Firm*—Katten Muchin Rosenman LLP

(57) ABSTRACT

A multiplexing apparatus multiplexes two or more data streams and output to an arbitrarily selected circuit, and includes a time division switch for multiplexing inputted data and outputting the multiplexed data to a selected circuit, and a memory unit which stores real control data for controlling actual connection operations of the time division switch and virtual control data for controlling virtual connection operations.

6 Claims, 8 Drawing Sheets

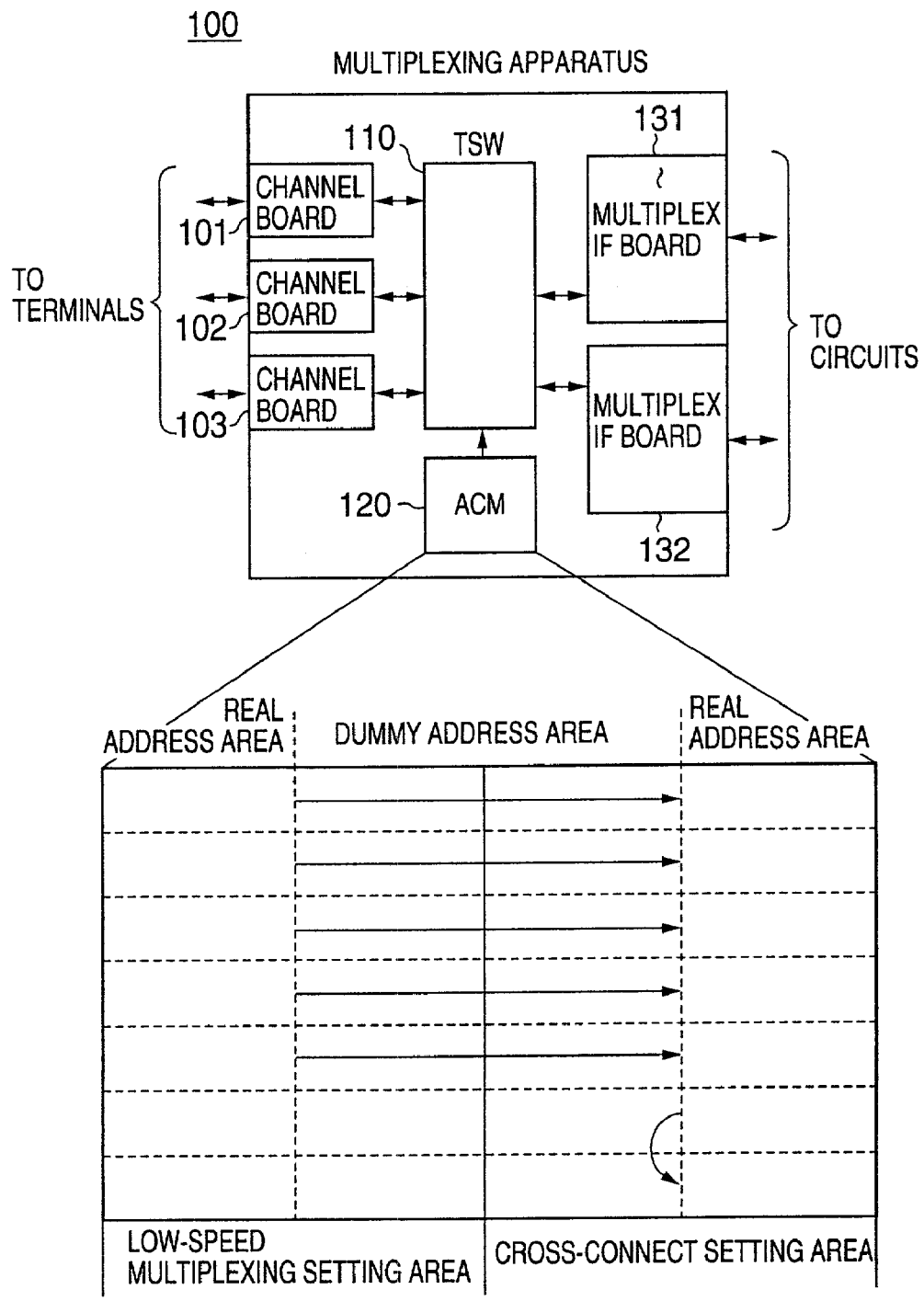

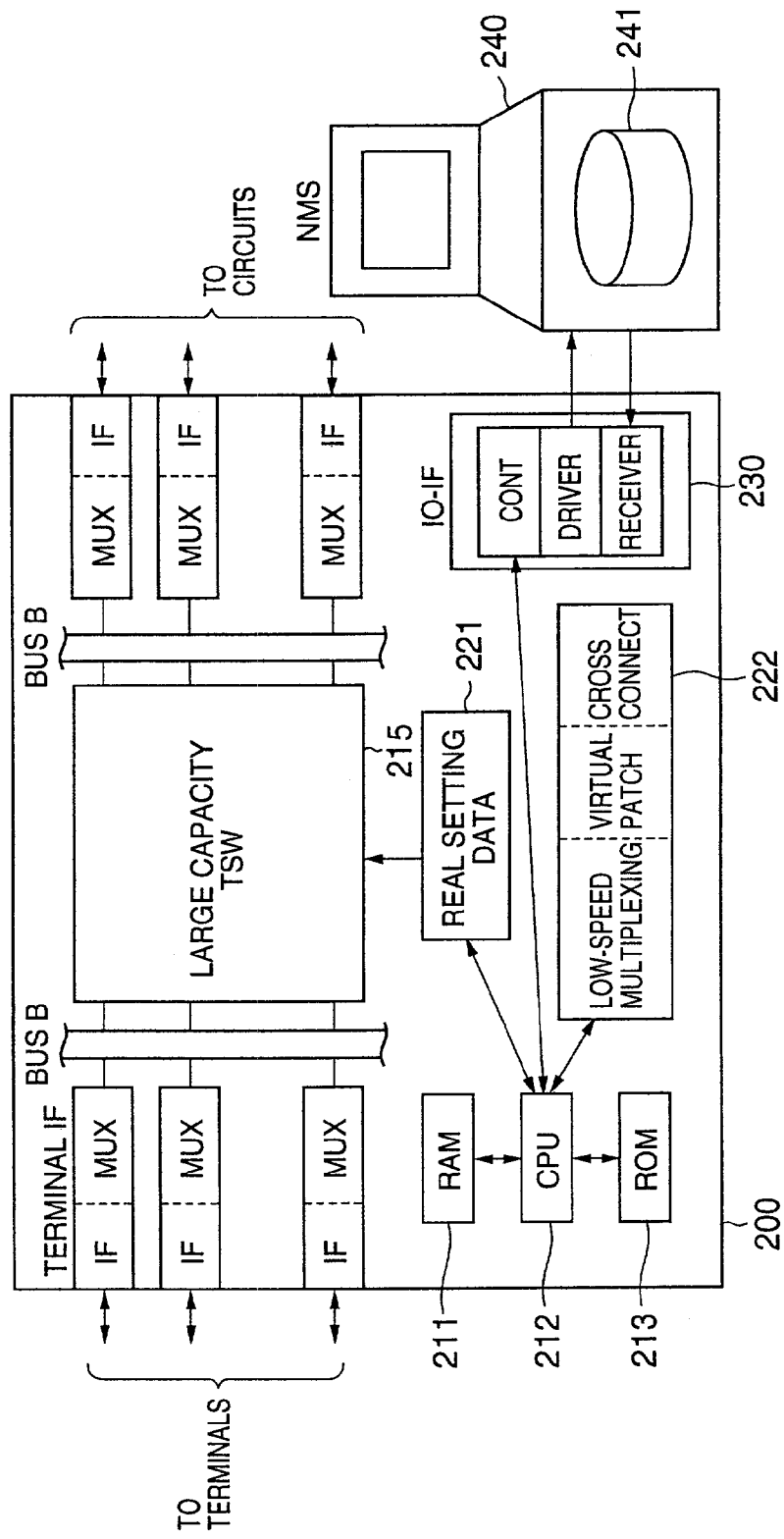

MULTIPLEXING METHOD, A MULTIPLEXING APPARATUS AND A NETWORK THEREWITH

This application is a continuation of international application number PCT JP99/05682, filed Oct. 14, 1999.

BACKGROUND OF THE INVENTION,

1. Field of the Invention

The present invention relates to a multiplexing method, a multiplexing apparatus and a network including the multiplexing apparatus, and especially relates to the multiplexing method and the apparatus that multiplex a plurality of data streams and output to an arbitrarily selected circuit and the network including the multiplexing apparatus.

2. Description of the Related Art

A time division switch (called TSW hereinafter) not only multiplexes two or more data streams but also often performs cross-connect processing that outputs the multiplexed data to an arbitrarily selected circuit.

FIG. 1 shows a block diagram of an example of a multiplexing apparatus 10. A conventional multiplexing apparatus 10 includes a low-speed multiplexing unit 20 which multiplexes low-speed data supplied from terminal units and outputs to a transmission path 28, and a cross-connect unit 30 which performs a cross-connect process of the data supplied from the transmission path 28.

The low-speed multiplexing unit 20 and the cross-connect unit 30 assign addresses to the terminal unit, the circuit, and the transmission, path 28, and have access control memory units 25 and 33 (henceforth ACM), respectively, that store information about relations between the addresses. The TSW 24 and 32 perform the multiplexing and the cross-connect process using the ACM 25 and ACM 33.

Technical progress in recent years has realized an economical high-speed and large-capacity TSW. Accordingly, one TSW unit can now replace the TSW 24 and 32 of FIG. 1.

FIG. 2 shows a block diagram of another example of a multiplexing apparatus 12. The multiplexing apparatus 12 of FIG. 2 replaces the TSW 24 and TSW 32 with one unit of TSW 40, thereby the low-speed multiplexing unit 20 and the cross-connect unit 30 are combined into one unit. In addition, ACM42 assigns addresses to terminal units and circuits, and stores information about relations between the addresses.

However, since the multiplexing apparatus 10 of FIG. 1 includes the two TSWs, namely TSW 24 and TSW 32, there is a problem that delay increases. Moreover, since the two ACMs, namely ACM 25 and ACM 33 are required, synchronization of the ACMs is necessary to attain correct operations.

On the other hand, the multiplexing apparatus 12 of FIG. 2 is structured with one each of TSW (the TSW40) and ACM (the ACM42), avoiding the problems of the delay and the synchronization as in the case with the multiplexing apparatus 10 of FIG. 1. However, there emerges another problem in that user convenience in circuit operations is facilitated if the multiplexing process and the cross-connect process are separated. That is, when a user operates a circuit, it is easier to manage the two processes separately, one for multiplexing and the other for cross-connect using two TSWs.

SUMMARY OF THE INVENTION

In view of the above-mentioned point, the present invention aims at offering a multiplexing method, a multiplexing apparatus, and a network therewith, wherein data for controlling a time division switch is virtually configured in two parts to facilitate management of the time division switch.

In order to achieve the above-mentioned objective, the multiplexing apparatus of the present invention includes a time division switch that multiplexes data inputted, and outputs the multiplexed data to a selected circuit, and a memory unit that stores real control data that controls actual connections of the time division switch and virtual control data that controls virtual connections.

By providing the two sets of data, namely the real control data and the virtual control data in the memory unit, one time division switch can be configured as if there were two time division switches. Accordingly, while maintaining ease in the management of the time division switch, an economical multiplexing apparatus can be realized.

Alternatively, the multiplexing apparatus of the present invention can include a memory unit that contains a first control data that controls connections of the time division switch when multiplexing inputted data, a second control data that controls connections of the time division switch when-outputting the multiplexed data, and virtual control data that virtually connects the first control data and the second control data.

In this manner, by separating the real control data to be stored in the memory unit into the first control data and the second control data, it becomes possible to control the multiplexing apparatus as if there were a first time division switch for multiplexing and a second time division switch for outputting the multiplexed data.

Moreover, the above-mentioned memory unit of the multiplexing apparatus of the present, invention may be structured such that an address is assigned to each terminal unit that provides data, and each circuit to which the multiplexed data is outputted, and a virtual address is set up to virtually connect the address of the terminal unit and the address of the circuit.

In this manner, one time division switch can be handled as if there were two time division switches.

Moreover, the above-mentioned memory unit of the multiplexing apparatus of the present invention may be structured such that an n address of a virtual transmission path for virtually connecting the terminal unit and the circuit is set up when setting up connections at the time division switch.

In this manner, by assigning an address to each of the terminal units and each of the circuits for outputting multiplexed data and by setting up an address to the virtual transmission path for virtually connecting a terminal unit and a circuit, one time division switch can be handled as if there were two time division switches.

Moreover, the memory unit of the multiplexing apparatus of the present invention may be structured such that it detects real control data that is virtually connected by using the virtual control data when controlling connection operations of the time division switch.

In this manner, the detected real control data is used to control the connection operations of the time division switch, thereby one time division switch can be handled as if there were two time division switches.

Moreover, the multiplexing apparatus of the present invention may further include means for setting up the real control data and virtual control data.

This setting up means facilitates setting up of the real control data and virtual control data.

Moreover, the multiplexing method of the present invention includes a step of setting up the real control data for controlling actual connection operations of the time division switch that multiplexes inputted data, and outputs the multiplexed data to a selected circuit, a step of setting up the virtual control data for controlling virtual connection operations of the time division switch, a step of virtually connecting the real control data and the virtual control data, and a step of detecting the real control data connected by deleting the virtual control data.

In this manner, by providing the two sets of data, namely the real control data and the virtual control data, one time division switch can be handled as if there were two time division switches. Accordingly, while maintaining ease of a time division switch management, an economical multiplexing apparatus can be obtained.

Moreover, the multiplexing method of the present invention includes a step of assigning addresses for each terminal unit which supplies data and every circuit through which multiplexed data is outputted, a step of setting up a virtual address that virtually connects the address of the terminal unit and the address of the circuit, a step of virtually connecting the address of the terminal unit and the address of the circuit using the virtual address, and a step for detecting the addresses of the terminal and the circuit that are connected by deleting the virtual addresses.

Thus, by assigning addresses and virtual addresses, one time division switch can be handled as if there were two time division switches.

A network of the present invention is structured by a multiplexing apparatus that includes a time division switch for multiplexing inputted data and outputting the multiplexed data to a selected circuit, and a memory unit that stores real control data for controlling actual connection operations of the time division switch and virtual control data for controlling virtual connection operations.

Thus, by providing the two sets of data, namely the real control data and the virtual control data, in the memory unit, an economical multiplexing apparatus can be realized and as a result, an economical network can be realized.

Moreover, in the network of the present invention, the memory unit may be structured with first control data for controlling the connection operations of the time division switch when multiplexing inputted data, second control data for controlling the connection operations of the time division switch when outputting the multiplexed data, and virtual control data for virtually connecting the first control data and the second control data.

By separating the first control data from the second control data, it appears to a user that there are a first time division switch for multiplexing and a second time division switch for outputting the multiplexed data, facilitating management of the multiplexing apparatus and realizing an economical multiplexing apparatus. Accordingly, an economical network can be realized.

Moreover, the memory unit of the network of the present invention may include the multiplexing apparatus that assigns addresses to each terminal unit that supplies data and every circuit that outputs the multiplexed data, and sets up an address of the virtual transmission path that virtually connects the address of the terminal unit and the address of the circuit.

By providing the address of the virtual transmission path that virtually connects the address of the terminal unit and the address of the circuit, a multiplexing apparatus that is able to configure one time division switch as if there were two time division switches can be realized, thereby an economical network is realized.

BRIEF DESCRIPTION OF THE DRAWINGS

Features and advantages of the present invention will become clearer by reading the following detailed explanation, referring to an attached drawing.

FIG. 4 is a block diagram of an embodiment of a multiplexing apparatus of the present invention.

FIG. 9 is a detailed block diagram of an embodiment of the multiplexing apparatus of the present invention.

DESCRIPTION OF THE PREFERRED EMBODIMENTS

In the following, embodiments of the present invention are described with reference to the accompanying drawings.

Figure 1:
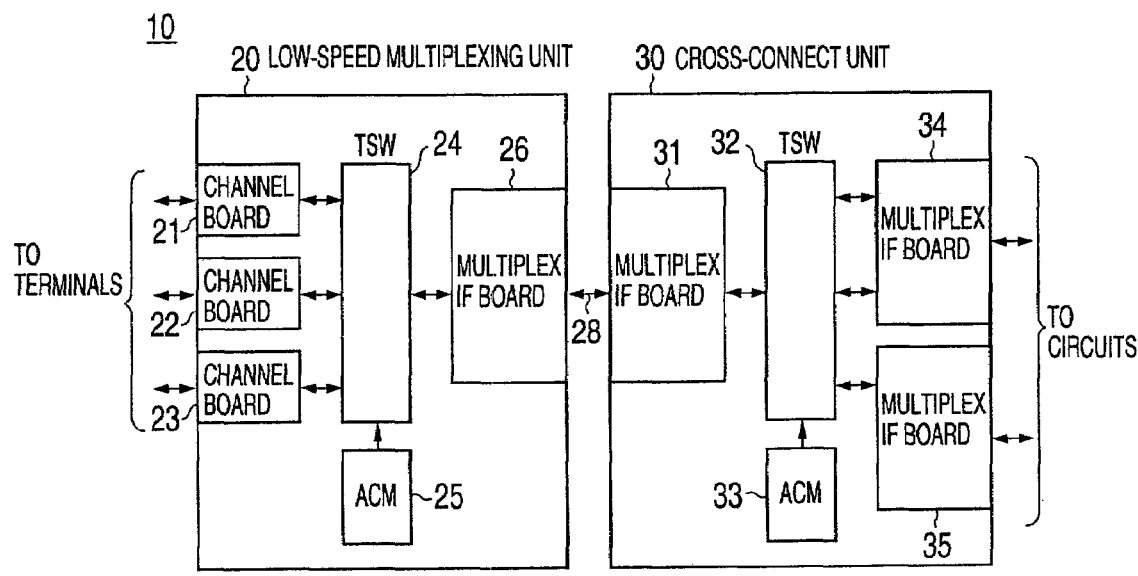
FIG. 1 is a block diagram of an example of a multiplexing apparatus.
Figure 2:
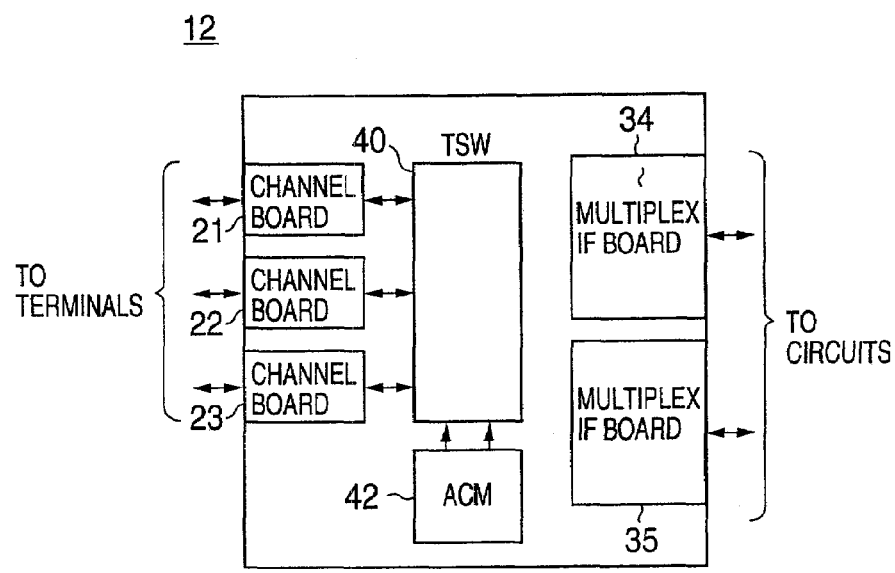
FIG. 2 is a block diagram of another example of the multiplexing apparatus.
Figure 3A:
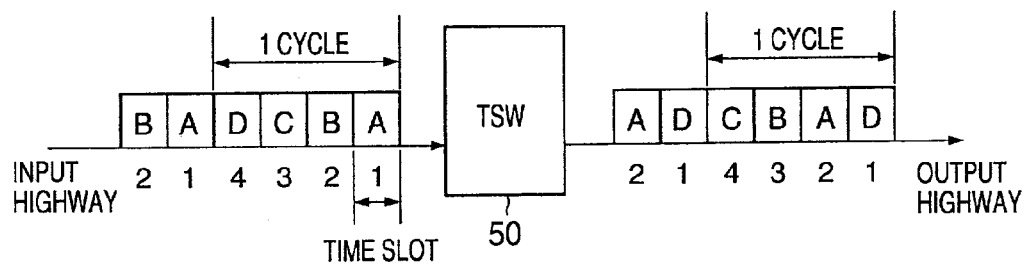
FIG. 3 is a figure for explaining operations of an example of a TSW.

First, processing of a TSW is explained briefly. FIG. 3 shows a figure of an example explaining the operation of a TSW 50. In FIG. 3(A), data having four time slots per cycle is supplied to the TSW 50 from an input highway. The data is supplied to the TSW 50 in the sequence of "A, B, C, D, A, B, C, D, and so on".

Figure 3B:
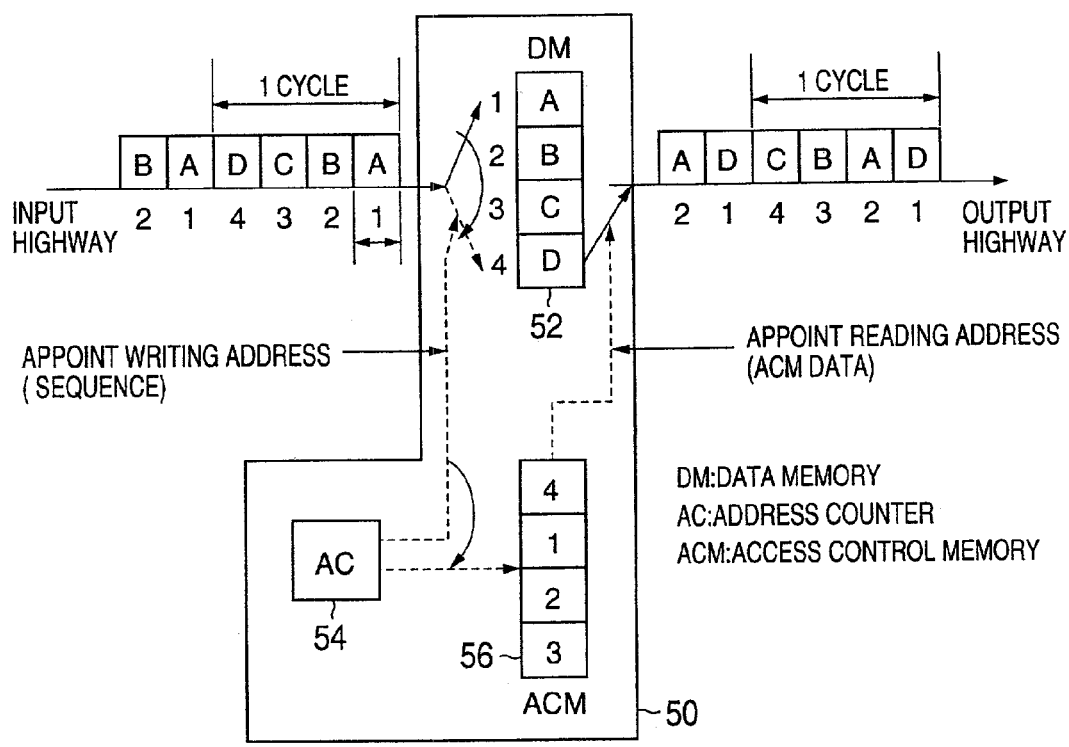

As shown in FIG. 3(B), the data supplied to the TSW 50 is switched according to an address counter 54, and is written in a data memory unit 52 for every time slot. Then, the data written in the data memory unit 52 is read from the data memory unit 52 to an output highway according to data set beforehand in an access control memory unit (henceforth ACM) 56.

Specifically, the data supplied to the TSW 50 is written in the sequence of "A,B,C,D" in the data memory unit 52, and read in the sequence of "D-A-B-C" according to the data set in the ACM 56. By reading the data stored in the data memory unit 52 according to the data set beforehand in the ACM 56, rearrangement of time slots is realized.

Next, a structure of a multiplexing apparatus of the present invention is explained with reference to FIG. 4. FIG. 4 shows a block diagram of an embodiment of a multiplexing apparatus 100 of the present invention.

The multiplexing apparatus 100 of FIG. 4 includes channel boards 101–103, a TSW 110, an ACM 120, and multiplex IF boards 131 and 132. The channel boards 101–103 are connected, for example, with a telephone, a terminal unit and the like, and low-speed signals, such as voice and data, are supplied. The multiplex IF boards 131 and 132 are connected to other multiplexing apparatuses and the like through a circuit.

After multiplexing low-speed signals supplied from the channel boards 101–103, the TSW 110 performs a cross-connect process, and outputs to the multiplex IF boards 131 and 132. The processing of the TSW 110 is performed according to addresses and the like stored in the ACM 120.

The ACM 120 includes a real address area that stores addresses actually assigned to terminal units and circuits, and a dummy address area that stores dummy addresses. Further, each of the real address area and the dummy address area includes a low-speed multiplex setting area and a cross-connect setting area. The real address area of the low-speed multiplex setting area and the real address area of the cross-connect setting area are set up through the dummy address area.

By preparing the dummy area, the address area of the ACM can be considered as having a virtual two-step structure, appearing as if two TSWs were connected in series, although actually there is only one TSW. Specifically, it is possible to consider that the TSW 110 of FIG. 4 is divided into two parts, and there is a dummy transmission path between them.

Accordingly, an actual circuit setup can be obtained by combining a setup of the low-speed multiplex setting area for a section from a terminal unit to a dummy transmission path and a setup of the cross-connect setting area for a section from the dummy transmission path to a circuit.

It is also possible to setup a direct connection of the real address areas without using the dummy address area. Further, a setup between a terminal unit and another terminal unit, and a setup between a circuit and another circuit are also possible.

Figure 5:
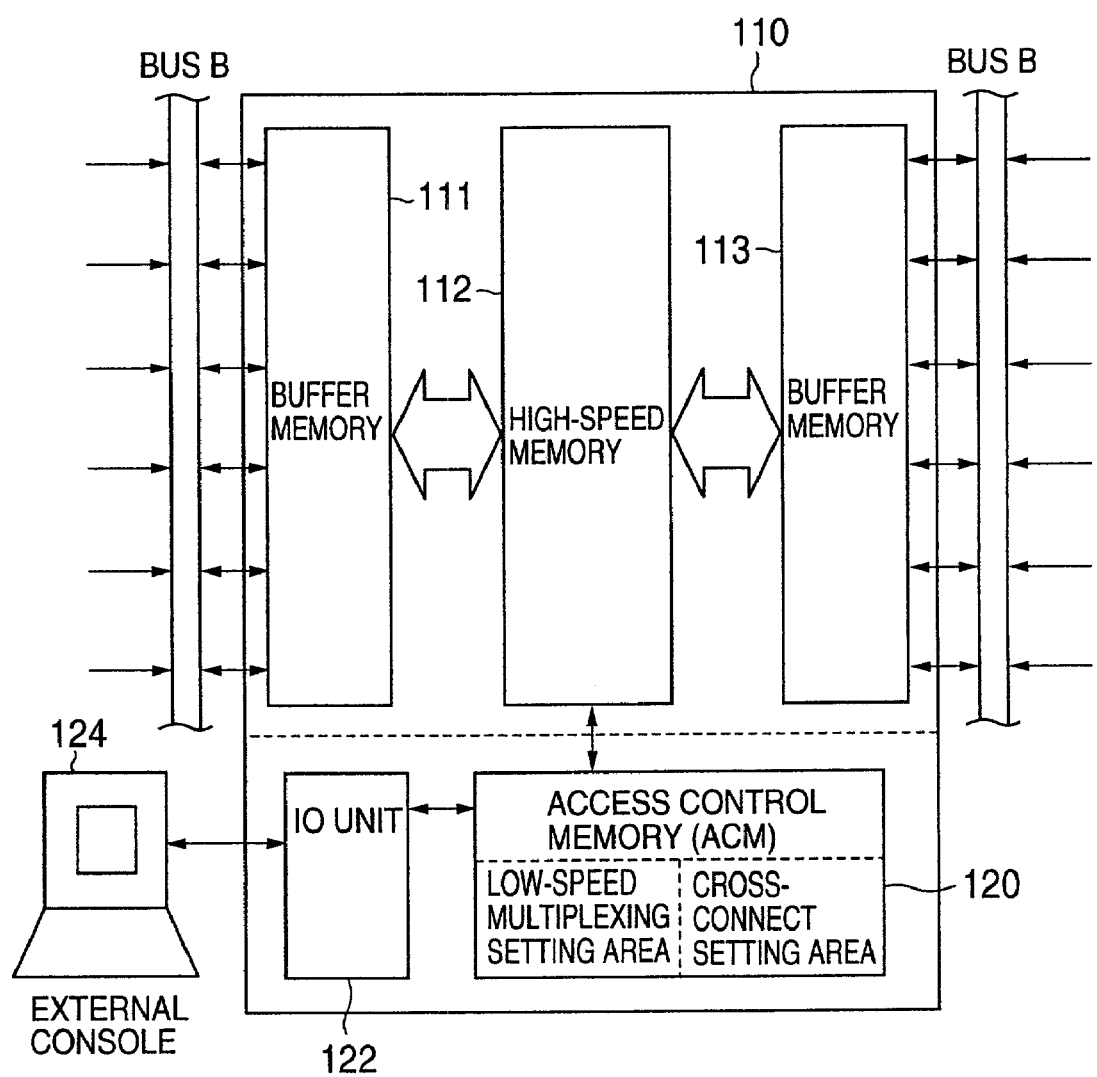
FIG. 5 is a block diagram of an embodiment of a TSW.

Next, the structure of the TSW is further explained in detail with reference to FIG. 5. FIG. 5 shows a block diagram of an embodiment of the TSW 110. The TSW 110 includes buffer memory units 111 and 113, and a high-speed memory unit 112.

The channel boards 101–103 and TSW 110 are often connected by a high-speed bus B, and the buffer memory unit 111 is formed for providing synchronization between the bus B and the high-speed memory unit 112. Further, the multiplex IF boards 131 and 132 and the TSW 110 are often connected by a high-speed bus B, and the buffer memory unit 113 is formed for providing synchronization between the bus B and the high-speed memory unit 112.

Writing addresses and reading addresses stored in the ACM 120 control writing and reading processing of the high-speed memory unit 112. The writing addresses and the reading addresses stored in the ACM 120 are set up by using an external console 124 connected via an I/O unit 122. The external console 124 may be an independent unit, or may be structured by adding a keyboard and a display to the multiplexing apparatus 100.

Figure 6:
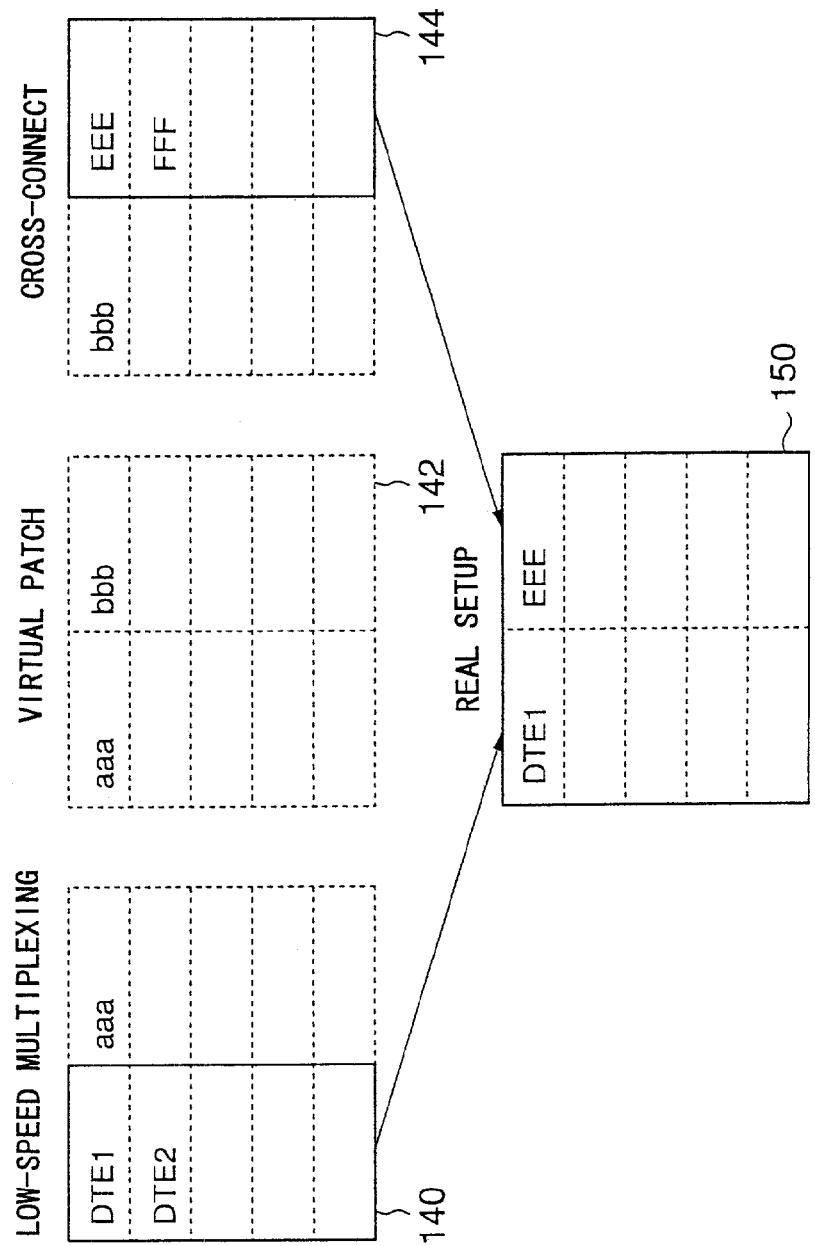
FIG. 6 is a block diagram of addresses stored in an ACM.
Figure 7:
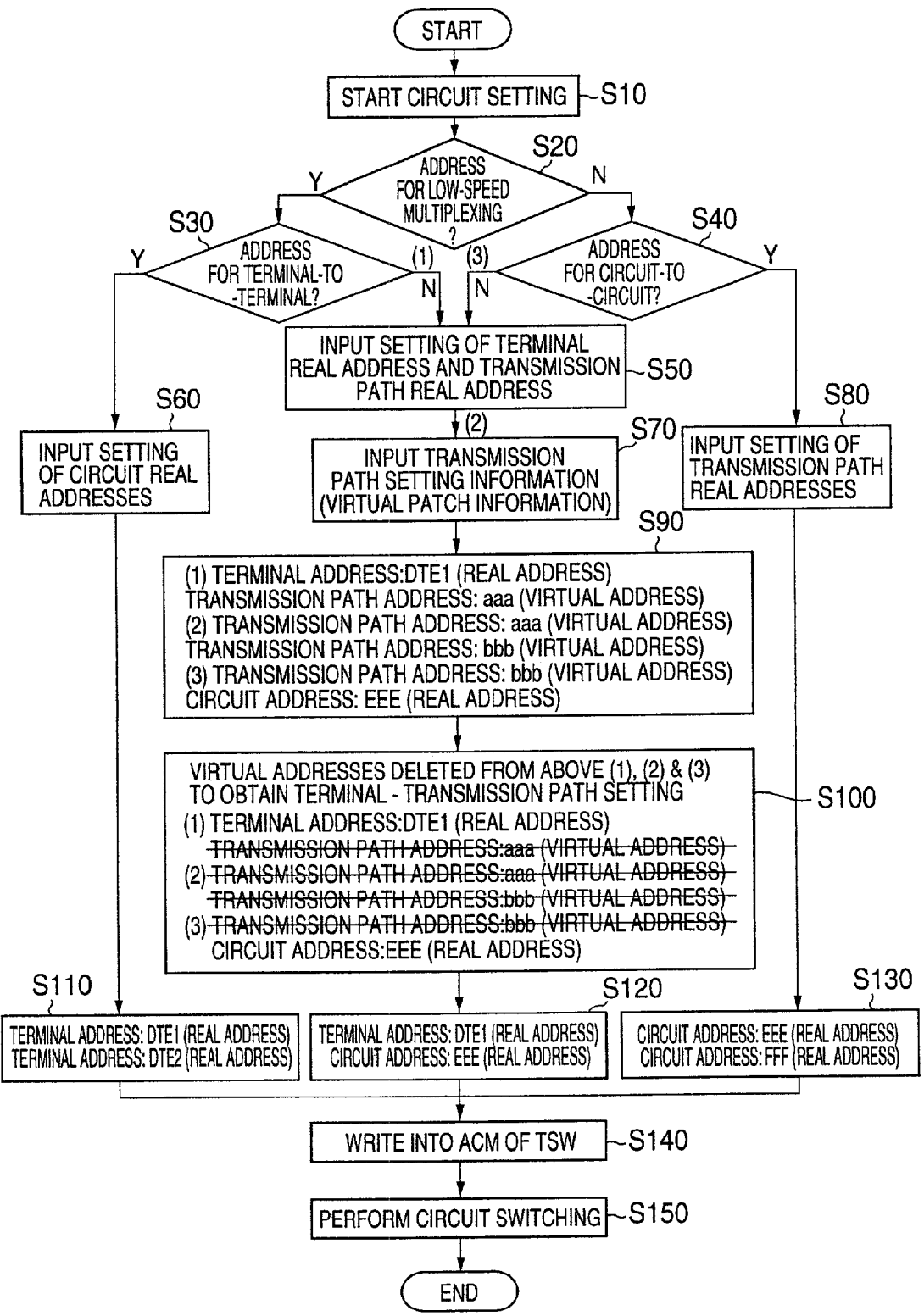
FIG. 7 is a flowchart explaining an embodiment of processing of the multiplexing apparatus of the present invention.

Next, an operation of the multiplexing apparatus 100 is explained with reference to FIGS. 6 and 7. FIG. 6 shows a block diagram of an example of the addresses stored in the ACM 120. FIG. 7 shows a flowchart explaining a process of the embodiment of the multiplexing apparatus 100 of the present invention.

As shown in FIG. 6, the ACM 120 includes a low-speed multiplex area 140, a virtual patch area 142, and a cross-connect area 144. Contents set to the low-speed multiplex area 140 and the cross-connect area 144 are transposed to real setup 150, according to which actual connections are established through the process shown in the flowchart of FIG. 7.

In the flowchart of FIG. 7, a setting address is inputted, for example, from the external console 124 at step S10. Subsequently, the process moves on to step S20 where a check is made as to whether the inputted address is for the low-speed multiplex area 140.

If it is determined that the inputted address is for the low-speed multiplex area 140 (YES at S20), the process moves on to step S30. Otherwise (NO at S20), the process moves on to step S40.

At step S30, a check is made as to whether the inputted setting address is for terminal to terminal. If it is determined that the address is for terminal to terminal (YES at S30), the process moves on to step S60. Otherwise (NO at S30), the process moves on to step S50.

At step S40, a check is made as to whether the inputted setting address is for circuit to circuit. If it is determined that the address is for circuit to circuit (YES at S40), the process moves on to step S80. Otherwise (NO at S40), the progress moves on to step S50.

When it is determined that the setting address inputted is not for terminal to terminal at step S30, or when it is determined that the setting address inputted is not for circuit to circuit at step S40, the process moves on to step S50. Then, real addresses of a terminal and a circuit are inputted into the low-speed multiplex area 140 and the cross-connect area 144, respectively, of the ACM 120. For example, in FIG. 6, an address "aaa" is inputted for a terminal DTE1 and an address "bbb" is inputted for a circuit EEE.

Following step S50, the process moves on to step S70 where virtual patch area information for assigning a virtual address to a virtual transmission path is inputted. Subsequently at step S90, addresses set to the low-speed multiplex area 140, the virtual patch area 142, and the cross-connect area 144 are read.

Then, at step S100, contents of the virtual address are removed from the addresses read at S90. Further, at step S120, real addresses of a terminal and a circuit are set up.

In addition, at step S30, if it is determined that the setting address is for terminal to terminal (YES at S30), the process moves on to step S60 where real addresses of the terminals are inputted, without assigning virtual addresses. The process then progresses to step S110 where the real addresses for terminal-to-terminal are set up.

If, at step S40, it is determined that the setting address is for circuit to circuit (YES at S40), the process progresses to step S80 where real addresses of the circuits are inputted, without assigning virtual addresses. Subsequently at step S130, the real addresses for circuit-to-circuit are set up.

After any one of step S110, step 120 and step 130, the process progresses to step S140 where the real addresses are stored in the ACM 120, and then, a circuit is established at step S150.

Figure 8:
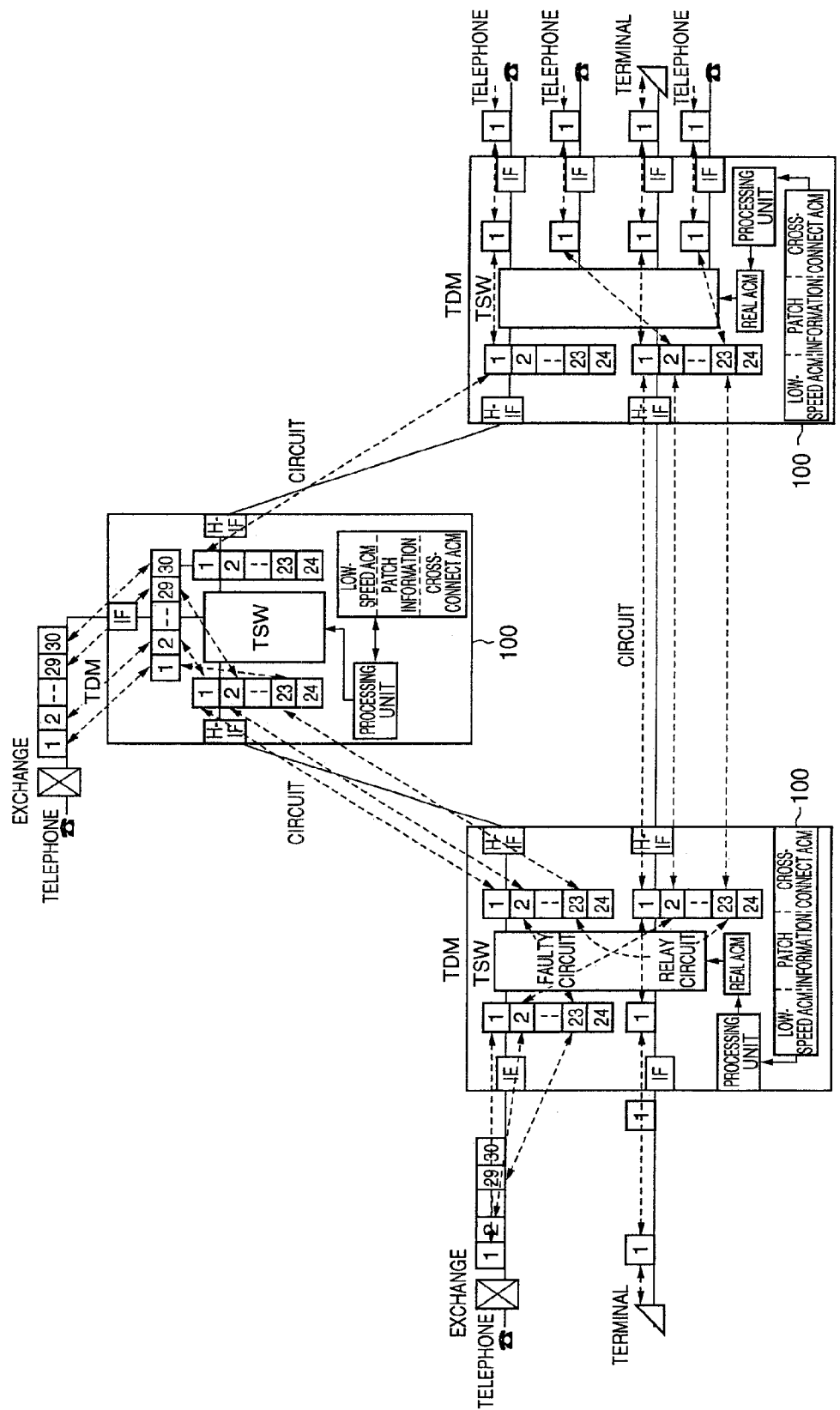
FIG. 8 is a block diagram of an example of a network including the multiplexing apparatus of the present invention.

Next, a description follows of a network that includes the multiplexing apparatus 100 of the present invention with reference to FIG. 8. FIG. 8 shows a block diagram of an example of the network that includes the multiplexing apparatus 100 of the present invention.

Circuit management is easier to perform if a low-speed multiplexing apparatus that multiplexes low-speed signals supplied from voice or data terminals, and a cross-connect apparatus that is a component of a digital path are separated. Especially in a mesh network as shown in FIG. 8, a role of the cross-connect apparatus in circuit setting becomes important, and it is necessary to separate the circuit setup of the cross-connect apparatus from circuit setup of the low-speed multiplexing processing.

In addition, in a control center of a network, when installing a network management system NMS that stores circuit setup data of the whole network and performs an alternate routing when a fault and the like occurs, it is possible to separate setting data of each ACM similarly as above.

Next, a structure of the multiplexing apparatus of the present invention is further explained in detail. FIG. 9 shows a detailed block diagram of an embodiment of a multiplexing apparatus 200 of the present invention.

The multiplexing apparatus 200 of FIG. 9 updates data stored in an ACM 222 by a device control unit that includes RAM 211, CPU 212, and ROM 213. The CPU 212 generates real setting data 221 by calculating data stored in the ACM 222, and performs circuit switching of TSW 215 using the real setting data.

An NMS 240 connected through an I/O-IF unit 230 includes a large-capacity disk 241 for storing the setting data of the whole network, and if needed, the setting data is distributed to a node in the network, and the NMS 240 performs alternate routing change processing when an obstacle and a fault occurs.

As mentioned above, in the present invention, two tasks of a multiplexing apparatus can be virtually achieved by one multiplexing apparatus, and circuit management can be facilitated. Further, because the number of TSWs decreases, an economical network is attained, and also a reduction in delay, an improvement in a voice quality, an improvement in data response, an increase in throughput, etc., can be realized.

What is claimed is:

1. A multiplexing apparatus, comprising: a time division switch that multiplexes data inputted and outputs the multiplexed data to a selected circuit, and a memory unit that stores real control data for controlling actual connection operations of the time division switch, and virtual control data for controlling virtual connection operations, wherein the memory unit assigns an address to every terminal unit that provides data and every circuit that outputs the multiplexed data, and assigns a virtual address for virtually connecting the address of the terminal unit and the address of the circuit.

2. The multiplexing apparatus as claimed in claim 1, wherein the memory unit assigns an address to a virtual transmission path that virtually connects a terminal unit and a circuit when setting up connection operations of the time division switch.

3. A multiplexing apparatus, comprising: a time division switch that multiplexes data inputted and outputs the multiplexed data to a selected circuit, and a memory unit that stores real control data for controlling actual connection operations of the time division switch, and virtual control data for controlling virtual connection operations, wherein the memory unit detects real control data that is virtually connected by using the virtual control data when controlling connection operations of the time division switch.

4. A multiplexing method, comprising:

a step of setting real control data, the real control data being for controlling actual connection operations of a time division switch that multiplexes inputted data and outputs the multiplexed data to a selected circuit, a step of setting virtual control data, the virtual control data being for controlling virtual connection operations of the time division switch, a step of virtually connecting the real control data and the virtual control data, and a step of detecting the real control data connected by deleting the virtual control data.

5. A multiplexing method, comprising:

an address assigning step of assigning addresses to each terminal unit that supplies data and to each circuit that outputs multiplexed data, a virtual address assigning step of assigning a virtual address that virtually connects the address of the terminal unit and the address of the circuit, a virtual connection step of virtually connecting the address of the terminal unit and the address of the circuit using the virtual address, and an address detecting step of detecting the address of the terminal unit and the address of the circuit, both having been connected, by deleting the virtual address.

6. A network, comprising a multiplexing apparatus which includes:

a time division switch that multiplexes data inputted and outputs the multiplexed data to a selected circuit, and a memory unit which stores therein real control data for controlling actual connection operations of the time division switch, and virtual control data for controlling virtual connection operations, wherein the memory unit assigns an address to each terminal unit that provides data and every circuit that outputs the multiplexed data, and assigns an address to a virtual transmission path that virtually connects the address of the terminal unit and the address of the circuit.

* * * * *